Sept. 22, 1959   T. T. CAGLE   2,905,277
VEHICLE BRAKING OPERATOR WITH SLACK ADJUSTOR
Filed June 15, 1955   2 Sheets-Sheet 1

INVENTOR.
TOBY T. CAGLE
BY Robert M. McManigal
Attorney

Sept. 22, 1959  T. T. CAGLE  2,905,277
VEHICLE BRAKING OPERATOR WITH SLACK ADJUSTOR
Filed June 15, 1955  2 Sheets-Sheet 2

INVENTOR.
TOBY T. CAGLE
BY Robert M. McManigal
Attorney

United States Patent Office 2,905,277
Patented Sept. 22, 1959

2,905,277

VEHICLE BRAKING OPERATOR WITH SLACK ADJUSTOR

Toby T. Cagle, Bellflower, Calif., assignor to Airheart Products, Inc., Long Beach, Calif., a corporation of California Application June 15, 1955, Serial No. 515,590

4 Claims. (Cl. 188—152)

The present invention relates generally to brakes for wheeled vehicles, and is more particularly concerned with means for automatically compensating for brake wear, and for adjusting brake release clearance.

The present invention constitutes a continuation-in-part of my copending application, Serial No. 136,013, filed December 30, 1949, now abandoned.

It is one object of the present invention to provide means to automatically adjust the brake release clearance so as to compensate for changes in the clearance due to thermal expansion, installation of new braking elements, and other factors inherent in vehicle brake structures.

A further object of the invention is to provide a unique structure in a vehicle brake, which combines the brake release clearance compensation feature with improved means for automatically indicating and compensating for brake wear.

Another object is to provide improved fluid actuated means for automatically adjusting the brake release clearance each time the brake is used, and whereby uniform operation of the master cylinder by the brake pedal will result.

Briefly the present invention comprises power means for actuating the brake elements, the power means comprising a cylinder within which there is mounted a main piston, an auxiliary piston, and a fixed member. A unique connection means are provided between the main piston and the fixed member, which are so arranged that during normal operation the main piston is confined to reciprocable movement between predetermined limits which constitute the brake clearance space when the brake is in released position. In addition to the limited movement of the main piston, a holding device is incorporated in the connection which is arranged to release the main piston for movement beyond the predetermined limits when a predetermined holding force of the device is exceeded. With this arrangement, the braking elements are actuated within the predetermined limits or clearance space until such time as the brake wear becomes so great that the brake will not set up tightly within the predetermined limits of movement. Under such condition, the actuating pressure applied to the main piston causes relative movement beyond the predetermined limits as a result of exerting a force which is greater than the opposing force of the holding device. Upon release of the brake, the piston is withdrawn by return spring means which is operative within the predetermined limits of movement of the main piston.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
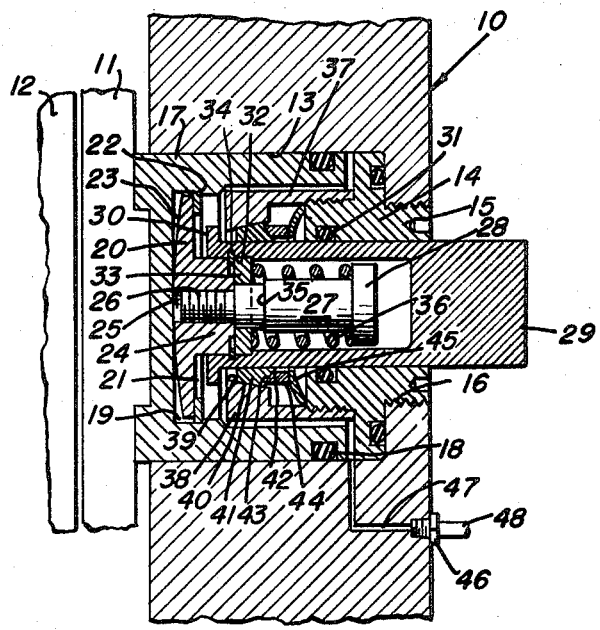
Fig. 1 is a diametral section taken through a brake operating mechanism embodying the features of the present invention, certain of the parts being shown in elevation for clearness.

Referring generally to the accompanying drawings, for illustrative purposes, the present invention is shown as embodying a body structure, as generally indicated by the numeral 10, which houses the brake actuating mechanism for moving an associated brake shoe 11 into and out of engagement with a brake drum 12 or other conventional braking element as may be associated with the vehicle wheel, and against which the braking forces are adapted to be applied.

The body structure 10 is formed with a cylindrical bore 13 which forms a cylinder of the operating mechanism for the brakes. This cylindrical bore is open at one end, and is closed at the opposite end by means of a head bushing 14 having an outer end 15 adapted to threadedly engage a wall opening 16 formed at this end of the cylindrical bore.

Within the cylindrical bore 13, there is positioned a main piston 17 of cup-shaped construction, this piston having its inner portion arranged to engage with the brake shoe 11, and being provided on its peripheral surface with a recessed O-ring 18 adapted to make sealing engagement with the cylinder wall.

Internally, the main piston has a circumferentially extending groove 19 adjacent the inner wall of the piston. This groove is adapted to receive therein the periphery of a disc member 20, the disc member being retained by means of a snap ring 21 which abuts a shoulder 22 of the retaining groove. The disc member 20 is provided with a curved surface 23 on the face thereof which is in confronting relation with the adjacent inner wall of the main piston, so that the disc member and the piston may have slight relative and rocking movements.

The disc member 20 is centrally provided with a hub portion 24 which is centrally provided with a bore 25 adapted to connectedly receive a threaded end 26 of an axially extending stud bolt 27 formed at its outer end with a head portion 28.

There is also mounted in the cylinder bore 13 an auxiliary piston 29 which is also of cup-shaped construction, this auxiliary piston having its outer end closed and its inner end open and formed with a radially projecting rim flange 30. The auxiliary piston is supported for reciprocable axial movement within the head bushing 14, this bushing having a recessed O-ring 31 for making sealing engagement with the outer surface of the auxiliary piston.

As thus mounted, the stud bolt 27 extends into the interior of the auxiliary piston through its inner open end, and the auxiliary piston is connected with this stud bolt so as to provide limited relative movement, as will now be explained. Adjacent the inner open end of the auxiliary piston, the inner wall thereof is provided with a circumferentially extending groove 32 which forms a seat for a stop member in the form of a collar member 33 which is held in seated position by means of a snap ring 34 in a suitable groove in the auxiliary piston wall, so that the collar 33 will be moved with the auxiliary piston during its reciprocable movements.

The inner periphery of the collar 33 surrounds a contracted portion of the stud bolt 27, which permits relative inward and outward movement of the collar between predetermined limit positions as established by the outwardly facing abutment formed by the adjacent end of the hub portion 24 on one side of the collar and the inwardly facing abutment formed by a shoulder 35 on the other side of the collar. A compression coil spring 36 surrounds the stud bolt 27 and has one end bearing against its head portion 28 and its other end bearing against the collar 33, this spring normally acting to bias the main piston 17 in a direction which will move the brake shoe to released or nonbraking position, the collar 33 in the nonbraking position being as shown in abutment with the adjacent hub portion 24.

In addition to the connection just described which permits limited relative movement between the stud bolt 27 and the auxiliary piston, a holding device is also provided for normally holding the auxiliary piston against bodily movement, except when there is a tendency to exceed the limited movement of the main piston as established by the movement of the collar 33, as just described above.

The holding device is shown as being positioned within a tubular projection 37 which is secured at one end to the head bushing 14 and concentrically surrounds the auxiliary piston. As shown, the other end of the tubular projection 37 is constructed with an inturned end flange 38 which carries on its inner periphery a bevelled surface 39 which engages with a coacting surface 40 formed on a grip ring 41 having wedging relation with the auxiliary piston.

The grip ring 41 is also provided with a second bevelled or inclined surface 42, this surface being inclined at a different angle than the surface 40, and being arranged to coact with a bevelled surface 43 formed upon a ring member 44. The ring member 44 is spring loaded by means of a Belleville spring 45 which biases the ring 44 and grip member 41 inwardly or to the left as viewed in Fig. 1. By inclining the surface 40 and the surface 42 of the grip member at different angles, it is possible to regulate the frictional pressure which will be applied in one direction of the movement of the auxiliary piston and obtain a different frictional pressure in an opposite direction of movement of the auxiliary piston. As shown, the inclined surfaces are so chosen that a greater frictional pressure will oppose movement of the auxiliary piston inwardly, than the pressure which opposes movement of the auxiliary piston in an outward direction.

Provisioin is made for supplying an operating fluid through a passage 47 into the cylinder for operating the pistons and actuating the braking elements. The passage 47 is brought out to a connection fitting 46, this fitting being adapted for terminal connection with a conduit 48 through which actuating fluid may be supplied from a suitable source.

The operation of the brake mechanism as thus far described will now be briefly explained. Referring to Fig. 1, the brake shoe 11 is shown as being in nonbraking position wherein it is spaced from the brake element 12, this spacing constituting the brake released clearance which is determined by the clearance space existing between the shoulder 35 on stud bolt 27 and the adjacent face of the collar 33. So long as this clearance is not exceeded, the main piston will be moved in a brake setting direction when operating fluid is supplied to the cylinder. Upon release of the fluid pressure, the main piston is moved in the opposite or released direction by the action of the spring 36. During this operation there will be no movement of the auxiliary piston 29.

Let it now be considered that the brake shoe has been worn sufficiently that there will not be enough clearance between the shoulder 35 and the collar 33 to permit the brake shoe to effectively engage the braking element 12 when operating fluid is admitted into the cylinder. Under such circumstances, the main piston will be moved within the limits of its movement, until the shoulder 35 engages the collar 33. Up to this point, the holding device will frictionally oppose movement of the auxiliary piston 29. However, as soon as the shoulder 35 strikes the collar 33, the main piston will act to apply pulling force against the auxiliary piston, and as soon as this pulling force exceeds the frictional force or drag on the auxiliary piston by virtue of the holding device, the auxiliary piston will be moved in unison with the main piston and full braking effect obtained against the braking element 12. Thus the auxiliary piston will be moved inwardly so as to compensate for the wear on the brake shoe, and the position of the auxiliary piston as viewed from its projecting exposed outer end will serve as a visual indicator of the amount of wear on the brake shoe.

When the pressure of the fluid within the piston is released, the spring 36 will act in the same manner as before to withdraw the brake shoe a distance corresponding with the built-in clearance as established by the space between the shoulder 35 and the adjacent face of the collar 33.

The operations just described are the usual normal operating conditions. However a different operating condition may prevail where, for example, the brake shoe 11 is in engagement with the braking element 12, when the main piston is in brake releasing position. Such a condition may exist in the event that a new braking shoe has been installed. When fluid pressure is applied within the cylinder, this pressure cannot cause movement of the main piston because the brake shoe is already against the braking element 12. It will be apparent that if the brake shoe clearance is not readjusted, the brake shoe cannot move away from the braking element 12 when the actuating pressure is released. Thus under such circumstances, when the actuating pressure is applied to the cylinder, and since the main piston can not move in a brake setting direction, this pressure will act to move the auxiliary piston outwardly until the collar 33 engages the shoulder 35 of the stud bolt. During this movement, the holding device opposes the movement of the auxiliary piston with less frictional force than opposes movement of the auxiliary piston in the opposite direction. Thus the built-in clearance is automatically reestablished.

Figure 2:
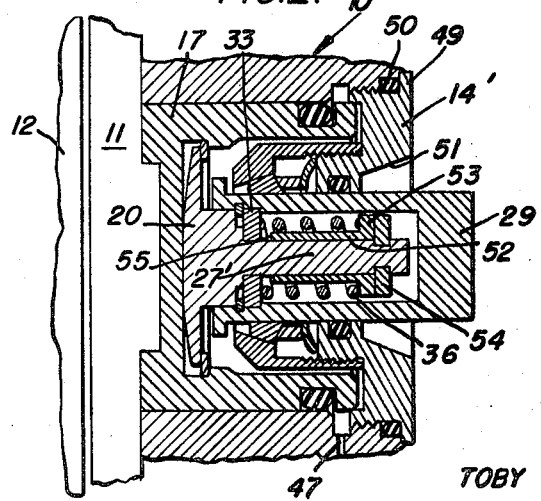
Fig. 2 is a similar view showing a modified structure embodying the invention.

The arrangement shown in Fig. 2 of the drawings is a modification in which the physical structure has been somewhat modified, but which includes the basic principles of operation inherent in the devices embodying the present invention. In the modified structure, similar numerals have been utilized to indicate the various elements which correspond to those which are embodied in the arrangement described and shown in Fig. 1.

Referring further to Fig. 2, this modification differs primarily in that the head bushing 14' is constructed so that it may be put in from the exterior rather than the interior of the cylinder. In order to adapt the bushing in such an arrangement, the bushing is provided with a peripheral sealing flange 49 which is adapted to engage with an O-ring 50 recessed in the body structure 10. Also it will be observed that instead of making the outer surface of the head bushing with a flush face, it is recessed or countersunk as shown at 51, in the portion adjacently surrounding the auxiliary piston 29. This arrangement facilitates the visual observation of the auxiliary piston in its function as an indicator of brake wear, the movement of the outer end to a position flush with the outer surface of the bushing tending to indicate that the brake shoe should be replaced.

An additional difference in construction resides in the utilization of a unitary construction of the disc 20 and the stud bolt 27, so that in the arrangement shown in Fig. 2, the disc has an integrally formed stem portion 27'. In this arrangement, a concentric sleeve 52 surrounds the stem 27' and has an end flange 53 which abuts a retaining ring 54 and forms an abutment for one end of the spring 36. It will be observed that the length of the sleeve 52 is such that its innermost end 55 forms an abutment corresponding with the shoulder 35 previously described. The operation of this modified construction is the same as that shown in Fig. 1.

Figure 3:
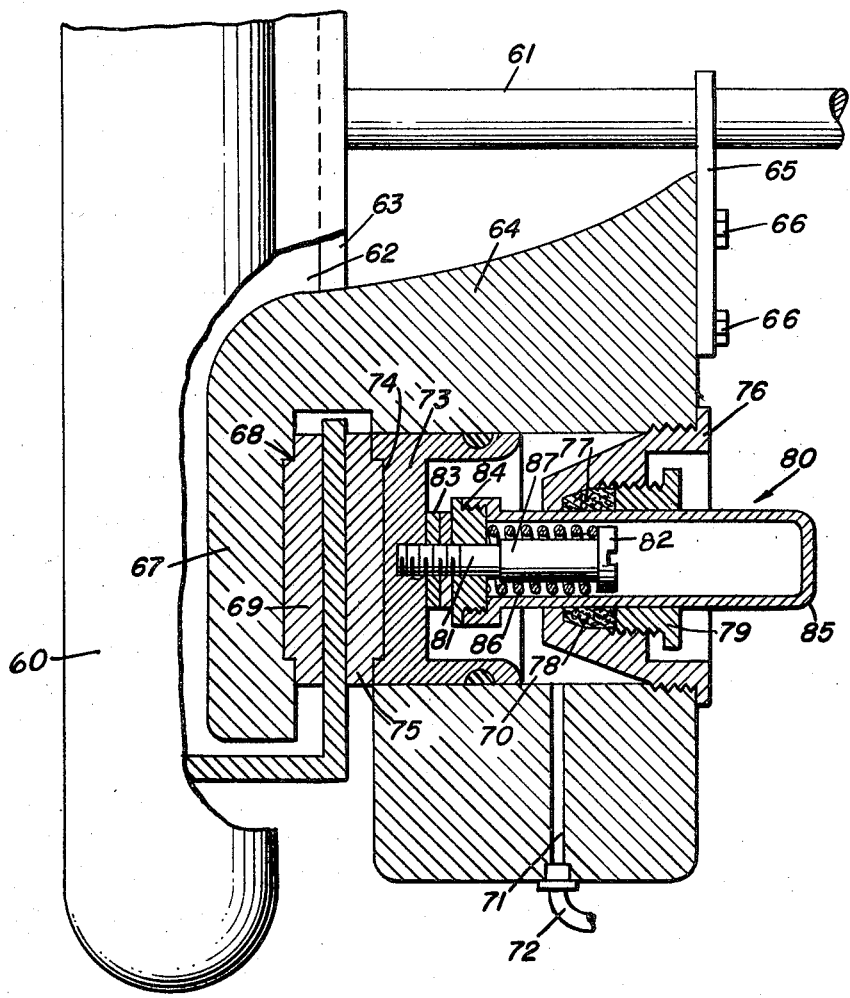
Fig. 3 is an elevational view partly in section of a modified arrangement for aircraft.

The illustrated form of the invention, Fig. 3, has been designed specifically for employment with an aircraft having a wheel 60 together with an axle 61. A brake drum casting 62 is applied in the usual and expected manner and it has a peripheral flange 63 extending inwardly thereof.

A cylinder block 64 is disposed adjacent the drum 62 and has a means of supporting it at that point. The illustrated means consists of a hanger 65 which is welded or otherwise fixed to the axle 61 and which is bolted as at 66 to the cylinder block.

Forming a part of the cylinder block is a backing plate 67 which is disposed in the brake drum 62 and which has a recess 68 therein. This recess accommodates an appropriately shaped end portion of a stationary brake element 69 which is carried thereby and which is adapted to engage the flange 63.

The cylinder block 64 has a cylinder 70 which forms a fluid chamber. This chamber has a fluid passage 71 communicating therewith which is a conductor of fluid received from the conduit 72. The conduit 72 is attached to any conventional mechanism for introducing fluid under pressure in the chamber 70.

A main piston 73 having a recess 74 in the head thereof is slidably disposed in the cylinder 70. It has a movable brake element 75 carried thereby and disposed in the recess 74.

The outer end of the cylinder is threaded in order to receive a closure in the form of a hollow nut 76. The hollow nut has a tapered opening 77 therein accommodating the resilient and flexible seal 78. This seal is held in place and compressed the desired amount by means of the jam nut 79 which is threaded in the opening in the hollow nut 76.

A piston adjuster assembly or piston adjuster generally indicated at 80 is secured to the piston head by means of a stud 81 having a head 82. Appropriate jam nuts 83 hold the stud fixed to the piston and form an outwardly facing abutment. An annular stop member 84 which resembles a thick washer and which has a threaded periphery is disposed on the shank of stud 81. An auxiliary piston in the form of a tube 85 is threaded on the member 84 and passes through the central opening in the hollow nut 76. The seal 78 presses against the outside surface of the tube 85.

A return spring 86 is disposed in the tube 85 and seats upon the head 82 and the member 84 respectively, constantly urging the stud 81 outwardly of the tube 85. There is an enlarged portion 87 on the stud 81 which is spaced slightly from the member 84 in order to form an inwardly facing abutment and provide a clearance, inasmuch as the piston 73 is capable of sliding inwardly and outwardly with respect to the tube 85 a slight amount as determined by the above mentioned abutments.

In operation fluid is applied under pressure in the chamber 70. This urges the piston head inwardly of the cylinder so as to cause the brake elements to engage the flange of the drum.

At this point the stud 81 moves inwardly with the piston and the spring return means including the spring 86 yieldingly opposes this operation. The stud passes through the element 84 until the clearance between the enlarged portion 87 of the stud and the element 84 is taken up. As the brake elements wear, the tube will move inwardly into the cylinder. The tube 85 serves as an indicator for the condition of the brake elements inasmuch as it moves with the piston after the clearance between the enlarged portion 87 and the element 84 is taken up.

While the indicator or tube 85 is moving with the piston, its movement is being opposed by the compression of the seal 78 against the outside surface thereof. Hence, when the spring 86 returns the piston, the first movement is the movement of the piston head. The amount of wear of the brake elements regulates the amount that the indicator moves into the cylinder.

It is believed that the operation of the modified structures will be readily apparent to those skilled in the art, and that further description of the operation will be unnecessary.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. Braking mechanism, comprising: cooperable braking elements mounted for relative movements into and out of engagement; a cylinder; a main piston for actuating one of said braking elements; an auxiliary piston of less active area than the main piston and having a longitudinal axis coaxial with the main piston axis; means interconnecting said pistons for limited relative movement; means for applying a fluid pressure between said pistons to relatively move the pistons to the extent of said limited movement; and a holding device for releasing said auxiliary piston for movement in one direction when a predetermined holding force is exceeded, and for movement in an opposite direction when a different holding force is exceeded, said holding device including a ring member in gripping relation to said auxiliary piston and having inclined surfaces independently activated in response to opposite directions of movement of the auxiliary piston to apply different gripping pressures against said ring member.

2. Braking mechanism, comprising: cooperable braking elements mounted for relative movements into and out of engagement; a cylinder; a main piston for actuating one of said braking elements; an auxiliary piston of less active area than the main piston and having a longitudinal axis coaxial with the main piston axis; means interconnecting said pistons for limited relative movement; means for applying a fluid pressure between said pistons to relatively move the pistons within the extent of said limited movement; and a holding device for releasing said auxiliary piston for movement in one direction when a predetermined holding force is exceeded, and for movement in an opposite direction when a different holding force is exceeded, said holding device including a ring member having bevelled annular surfaces inclined at different angles; a fixed member having a surface coacting with one of said bevelled surfaces; and a spring pressed member having a surface coacting with another of said bevelled surfaces.

3. Brake actuating mechanism having provision for taking up excessive clearance between a brake surface and a braking element and for indicating the extent of wear of such braking element comprising: a cylinder; a closure at one end of said cylinder; a brake actuating piston reciprocable within said cylinder; means for applying fluid pressure to said cylinder to move said piston inwardly of said cylinder; a stud fixed to said piston and extending axially outwardly of said cylinder in the direction of said closure; a head portion on the outer end of said stud; axially spaced inwardly and outwardly facing fixed abutments on said stud; an annular stop member surrounding and slideable on said stud between said abutments; a tube fixed to said annular stop member, said tube surrounding said stud and extending through said closure; deformable gripping means between said tube and said closure and surrounding and frictionally gripping the exterior surface of said tube; and a compression spring member surrounding said stud between said head portion and said annular stop member and resiliently urging said piston outwardly of said cylinder, engagement of said outwardly facing abutment with said annular stop member controlling the extent of outward movement of said piston, the application of fluid pressure to said cylinder causing inward movement of said piston against the resistance of said spring member to actuate the brake element, excessive inward movement of said piston causing said inwardly facing abutment to engage said annular stop member and move said annular stop member and said tube against the frictional gripping action of said deformable gripping means.

4. Brake actuating mechanism for actuating cooperable braking elements mounted for relative movement into and out of engagement and for establishing and maintaining a predetermined clearance between such braking elements, said mechanism comprising: a cylinder; a closure at the outer end of said cylinder; a main piston movable in an inward direction in said cylinder for moving one of said braking elements in brake applying direction; a stud fixed to said main piston and extending axially outwardly of said cylinder in the direction of said closure; a head portion on the outer end of said stud; axially spaced inwardly and outwardly facing fixed abutments on said stud; an annular stop member surrounding and slideable on said stud between said abutments; a tubular auxiliary piston fixed to said annular stop member, said tubular auxiliary piston surrounding said stud and extending through said closure; gripping means between said auxiliary piston and said closure and surrounding and gripping the exterior surface of said auxiliary piston; a compression spring member surrounding said stud between said head portion and said annular stop member and resiliently urging said main piston outwardly of said cylinder to a brake releasing position in which said outwardly facing abutment on said stud engages said annular stop member to establish a predetermined brake clearance; and means for applying a fluid pressure to said cylinder between said pistons to move said main piston inwardly of said cylinder in brake applying direction, said auxiliary piston overcoming the gripping action of said gripping means and moving with said main piston in the brake applying inward direction thereof when there is an excessive brake clearance such that said inwardly facing abutment on said stud engages said annular stop member prior to full application of the brake, and, when the brake clearance is below the predetermined value, the fluid pressure within said cylinder moving said auxiliary piston outwardly of said cylinder against the gripping action of said gripping means until said inwardly facing abutment engages said annular stop member.

References Cited in the file of this patent

UNITED STATES PATENTS

| | | |
|---|---|---|
| 2,160,055 | Brace | May 30, 1939 |
| 2,536,269 | Driscoll | Jan. 2, 1951 |
| 2,551,252 | Du Bois | May 1, 1951 |
| 2,644,549 | Cagle | July 7, 1953 |